Aug. 30, 1938.  W. F. GROENE  2,128,359
CRANKSHAFT CHUCK
Filed April 21, 1937  2 Sheets-Sheet 1
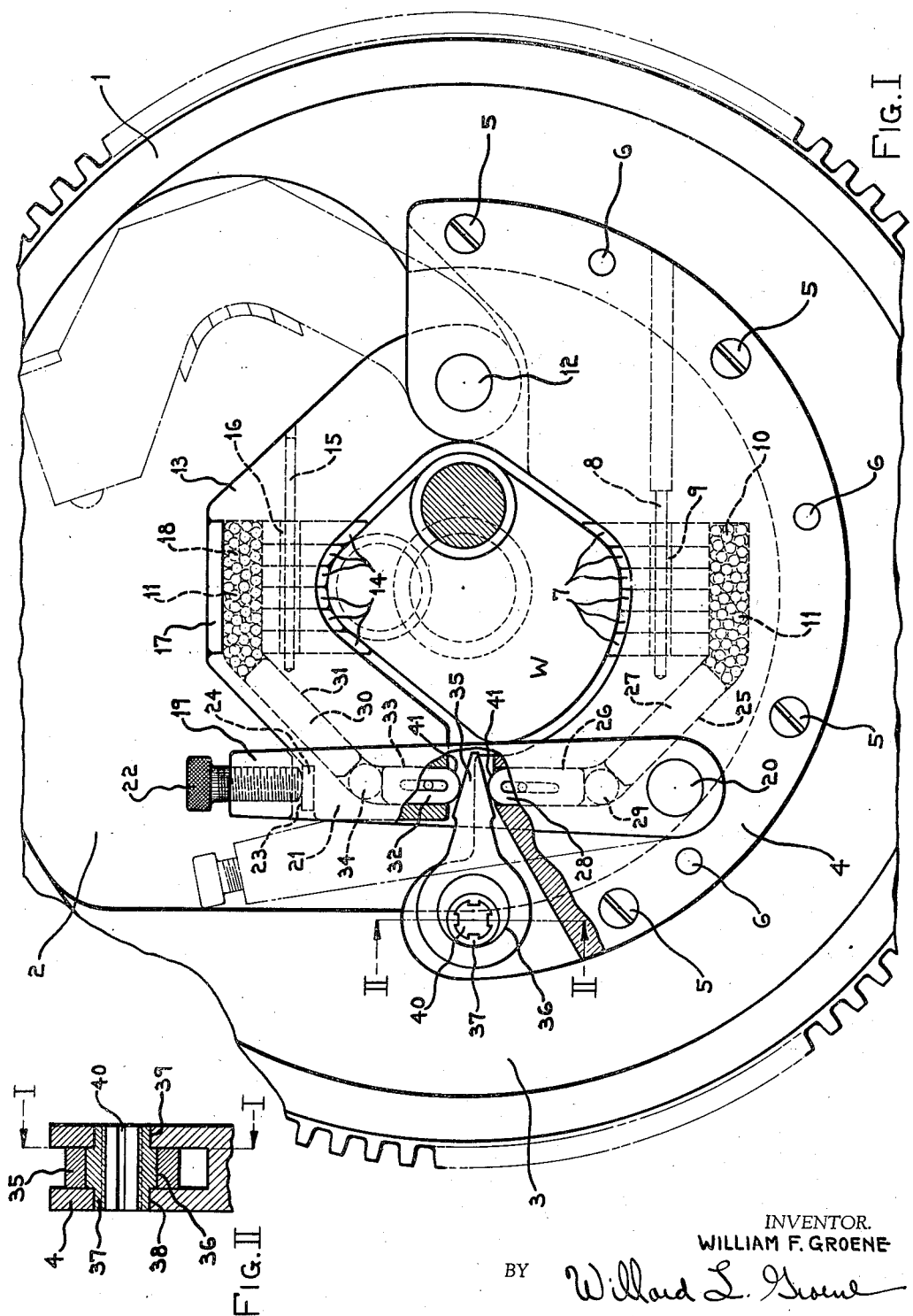
INVENTOR.
WILLIAM F. GROENE
BY Willard L. Groene
ATTORNEY.

Aug. 30, 1938.  W. F. GROENE  2,128,359
CRANKSHAFT CHUCK
Filed April 21, 1937  2 Sheets-Sheet 2
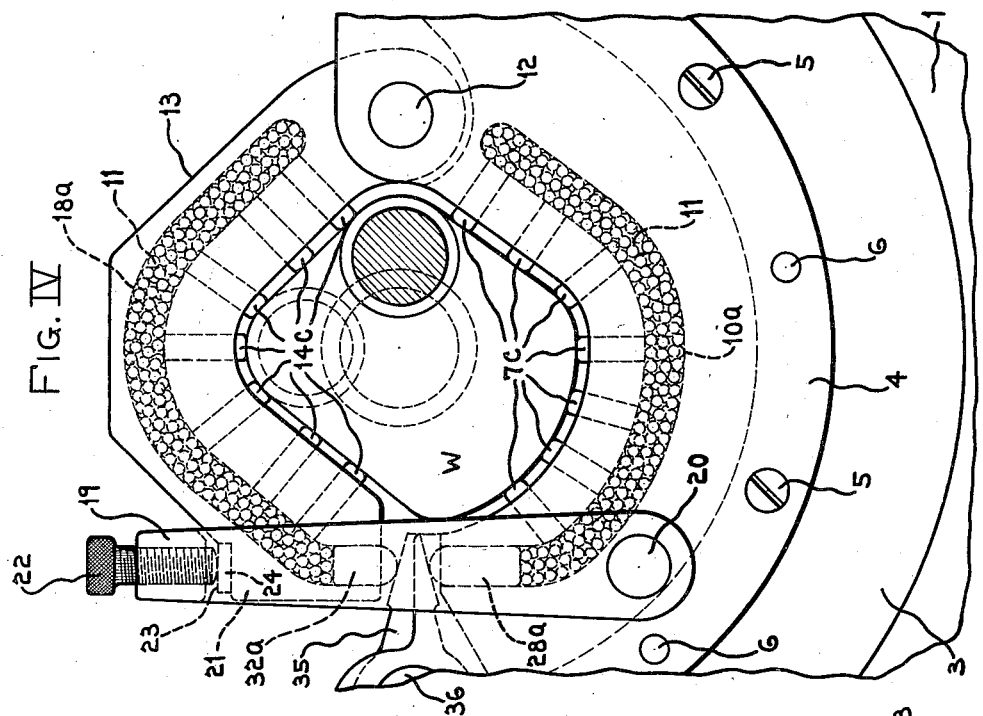
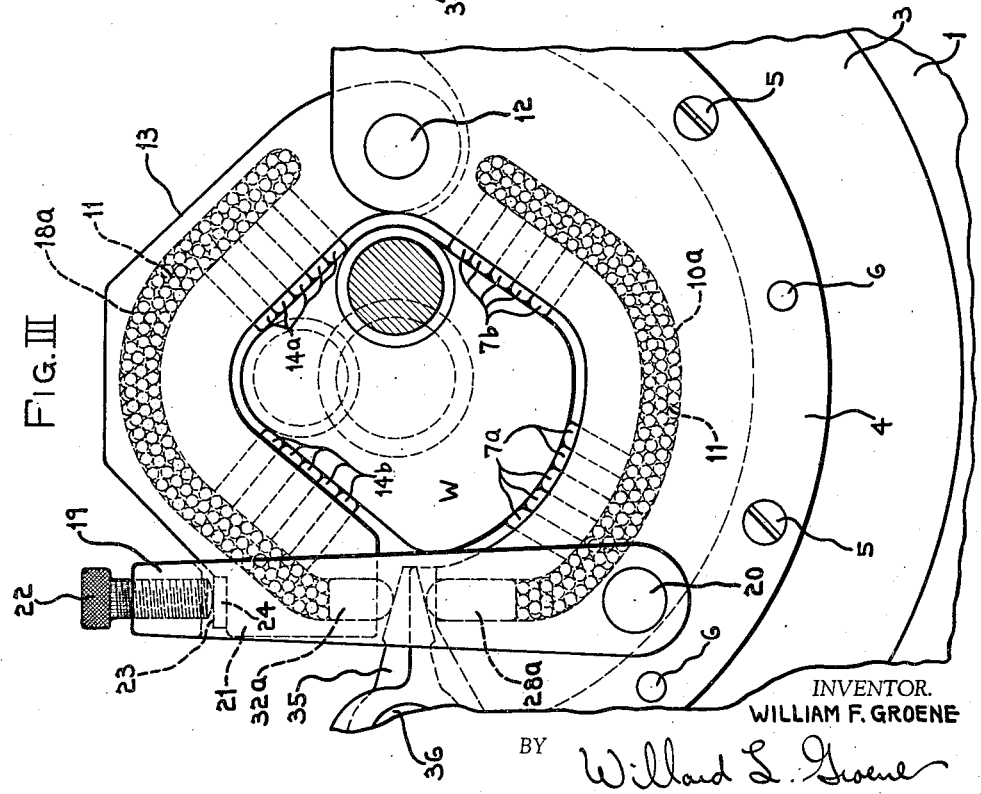
INVENTOR.
WILLIAM F. GROENE
BY Willard L. Groene
ATTORNEY.

Patented Aug. 30, 1938

2,128,359

UNITED STATES PATENT OFFICE 2,128,359

CRANKSHAFT CHUCK

William F. Groene, Cincinnati, Ohio, assignor to The R. K. Le Blond Machine Tool Company, Cincinnati, Ohio, a corporation of Delaware Application April 21, 1937, Serial No. 138,205

20 Claims. (Cl. 82—40)

This invention pertains to chucks for gripping irregular rough-surfaced work pieces which have been properly prelocated with respect to the axis of rotation of the chuck. More particularly this invention pertains to chucks for gripping the rough surfaces of webs of crankshafts to be chucked and rotated in a crankshaft lathe, for instance, of a character shown in Patent Number 2,069,107 issued January 26, 1937.

The chief object of my invention is to provide a chuck which is adapted to engage a pre-centered and pre-indexed work piece in a lathe by means of rough irregular surfaces thereof in such a way as to securely support, locate, and drive said work piece while maintaining it at all times in its proper pre-located position.

My invention further involves certain improvements in chucking devices of a character set forth in applications Serial No. 132,506 filed March 23, 1937, and Serial No. 136,634, filed April 13, 1937.

An object is to provide a chuck with series of opposed compensating plungers which are moved to engagement with the irregular pre-located work piece by applying pressure to a medium adapted to reciprocate said plungers whereby said work piece may be securely held by the plungers in its proper pre-located position.

Another object is to provide in a chuck or gripping device series of opposed gripping plungers adapted to engage a work piece, a pressure distributing medium for urging said plungers with equal force against said work piece and acting as a rigid abutment preventing movement of said plungers when fully engaged on said work piece, and means for applying pressure to the medium to cause the plungers to accurately chuck and drive said work piece in a pre-located position.

Another object is to provide in a chuck adapted to engage rough surfaces of a pre-centered work piece without distorting it from said pre-centered position, a series of compensating plungers mounted on the chuck body to one side of the axis of rotation of the chuck, a second series of compensating plungers adapted to be bodily moved relative to said first mentioned series of plungers to facilitate loading and unloading work in the chuck, inter-connecting means between both of said series of plungers so that equalizing action may take place between said series of plungers and said work piece, and means for applying force to said inter-connecting means whereby all of said plungers are caused to grip said work piece with equal force.

Further objects will appear from a description of the drawings, in which:

Figure I is an axial view, partly in section on the line I—I of Figure II, of a center drive ring gear chuck embodying the principles of my invention.

Figure II is a fragmentary view, in section on the line II—II of Figure I, particularly showing the mounting of the compensating clamping wedge and eccentric operating shaft.

Figure III is an axial view of a chucking device utilizing a plurality of series of compensating plungers operating in different directions.

Figure IV is an axial view of a chucking device showing an arrangement of applying plungers to the work in which each plunger moves in a line substantially perpendicular to the surface of the work piece at its point of contact therewith.

As an examplary disclosure I show my invention applied to a ring gear 1 of a center drive work spindle having an axial bore 2 through which work may be axially loaded into or out of the ring gear 1 manually, or by mechanical means, for example, as illustrated in Patent Number 1,700,721 issued January 29, 1929.

To the inner annular rib 3 formed integral with the ring gear 1 is fixed the frame 4 by suitable screws 5 and dowel pins 6. Slidably mounted in an appropriate slot in the frame 4 is a series of compensating plungers 7 adapted to move substantially radially of the axis of rotation of the chuck. A retaining pin 8 fixed in the frame 4 and passing through clearance holes 9 in each of the plungers 7 serves to retain them in the frame 4 while at the same time providing ample freedom of movement of the plungers to allow their outer ends to properly engage the rough irregular surfaces of the periphery of the web W of a crankshaft. Behind the plungers 7 is a chamber 10 containing a compensating pressure receiving medium such as a hydraulic fluid, a semi-liquid, or metallic balls or shot 11 as shown in this exemplary embodiment.

On the pin 12 fixed in the frame 4 is pivotally mounted the clamp 13 which has the compensating plungers 14 slidably mounted in a suitable slot formed in the clamp for movement substantially radially of the axis of rotation of the chuck. A retaining pin 15 fixed in the clamp 13 and passing through clearance holes 16 in each of the plungers 14 serves to retain them in the clamp 13 while at the same time providing ample freedom of movement of the plungers to allow their ends to properly engage the web W. A plate 17 is welded over the slot for the plungers 14 to thereby form a chamber 18 containing compensating pressure receiving medium 11 similar to that utilized in the chamber 10 for the plungers 7.

In order to maintain the clamp 13 in position over the web W so that the series of plungers 7 and 14 may properly engage the work, a bifurcated latch 19 is pivotally mounted on the pin 20 fixed in the frame 4 and is adapted to be swung over the outer end portion 21 of the clamp 13. A thumb screw 22, threaded in said latch is adapted to be lightly tightened down on the surface 23 of the hardened plate 24 fixed to the end 21 of the clamp 13 after the clamp has been initially swung over the work piece. The screw 22 is not utilized for tightening the chucking device on the work but merely for quickly compensating for and eliminating relative movement between the clamp 13 and the latch 19 brought about by variations in configuration of the surfaces between various different work pieces inserted in the chuck.

A novel feature of this invention is to interconnect the chambers 10 and 18 so that all of the plungers 7 and 14 will have compensating movements relative to each other and to cause all of said plungers to properly engage the work to hold it in pre-located position by applying pressure to said inter-connecting means. One arrangement would be to provide a passageway inter-connecting the chambers 10 and 18 to permit flow of the pressure medium between said chambers and to apply pressure to said medium at any point in the chambers or the passageway to cause the plungers to be urged against the work to be gripped.

Preferably, as shown in this exemplary embodiment particularly shown in Figure I, a bore 25 connecting with the bore 26 and the chamber 10 is formed in the frame 4. An axially slidable plunger 27 in the bore 25 is actuatable by the pressure medium 11 in the chamber 10 and by the wedge operated plunger 28 slidable in the bore 26 and engaging the ball 29 which in turn engages the plunger 27. Similarly in the cap 13 is an axially slidable plunger 30 in the bore 31 which is actuatable by the pressure medium 11 in the chamber 18 and by the wedge operated plunger 32 slidable in the bore 33 and engaging the ball 34 which in turn engages the plunger 30.

A wedge 35 is pivotally mounted on an eccentric 36 of the eccentric shaft 37 journaled in appropriate bearings 38 and 39 in the frame 4. A splined bore 40 is formed axially of the eccentric shaft 37 to which may be applied a suitable lever for powerfully rotating the shaft 37 for forcing the wedge 35 between or withdrawing the wedge from between the end portions 41 of the plungers 28 and 32. Forcing the wedge between the plungers 28 and 32 compresses the medium 11 in the chambers 10 and 18 to bring the plungers 7 and 14 into engagement with the work. Equalizing action between the series of plungers 7 and the series 14 is accomplished by the pivotal mounting of the wedge 35 which allows free swinging movement of the tapered end as required by the relative positions assumed by the plungers 28 and 32 under the influence of the work piece W.

Another arrangement for applying the gripping plungers to the work is that shown in Figure III wherein a plurality of series of compensating plungers 7a, 7b, 14a, and 14b are presented to a work piece from various directions. The plungers 7a and 7b are actuated by the compensating pressure medium 11, in the chamber 10a and the plungers 14a and 14b are actuated by the compensating pressure medium 11 in the chamber 18a. Equalized pressure is applied to the medium 11 in chambers 10a and 18a as in Figure I by the wedge 35 which operates between the plungers 28a and 32a appropriately mounted in the frame 4 and the cap 13, respectively.

Still another arrangement for applying the gripping plungers to the work is that shown in Figure IV, wherein a plurality of compensating plungers 7c and 14c are each adapted to be presented to a work piece from a different direction. In this arrangement the plungers may be spaced completely around the periphery of the work surface to be gripped and may be so arranged that each plunger may perpendicularly engage the surface to be gripped. The plungers 7c are actuated by the compensating pressure medium 11 in the chamber 10a and the plungers 14c are actuated by the compensating medium 11 in the chamber 18a. Equalizing pressure is applied to the medium 11 in chambers 10a and 18a as in Figure I by the wedge 35 which operates between the plungers 28a and 32a appropriately mounted in the frame 4 and the cap 13 respectively.

Having fully set forth and described my invention, what I claim as new and desire to secure by United States Letters Patent is:

1. A gripping device comprising jaws movable relative to each other, a carrier member fixed relative to a work piece in said device for each of said jaws, chambers formed by portions of said jaws and of said carrier members, a medium in said chambers, capable of adapting itself to all shapes of said chambers, acting as a rigid abutment, interconnecting means for said chambers to permit flow of said medium between said chambers, and means for applying pressure to said medium to cause relative movement of said jaws.

2. A gripping device comprising jaws movable relative to a work piece to be gripped, a carrier member fixed relative to a work piece in said device for said jaws, chambers formed by portions of said jaws and of said carrier members, a medium in said chambers, capable of adapting itself to all shapes of said chambers, acting as a rigid abutment, inter-connecting means for said chambers to permit flow of said medium between said chambers, and means for applying pressure to said medium to cause equalizing gripping action of said jaws on said work piece.

3. A gripping device comprising jaws movable relative to a work piece to be gripped, a carrier member fixed relative to a work piece in said device for said jaws, chambers formed by portions of said jaws and of said carrier member, a medium in said chambers, capable of adapting itself to all shapes of said chambers, acting as a rigid abutment, and means for applying pressure to said medium in said chambers to move said jaws to grip said work piece.

4. A gripping device comprising jaws movable relative to a work piece to be gripped, a carrier member fixed relative to a work piece in said device for said jaws, chambers formed by portions of said jaws and said carrier member, a medium in said chambers, capable of adapting itself to all shapes of said chambers, acting as a rigid abutment, and means for applying equalized pressure to said medium in said chambers to move said jaws to grip said work piece with equal force.

5. A gripping device comprising jaws movable relative to each other, each of said jaws comprising individually movable gripping elements, and a carrier means therefor fixed relative to a work piece in said device, a chamber formed by portions of said gripping elements and of said carrier means, and a medium in said chamber, capable of adapting itself to all shapes of said chamber, acting as a rigid abutment, inter-connecting means between said chambers to permit flow of said medium between said chambers, and means for applying pressure to said medium to cause relative movement of said gripping elements.

6. A gripping device comprising jaws movable relative to each other, each of said jaws comprising individually movable gripping elements, and a carrier means therefor fixed relative to a work piece in said device, a chamber formed by portions of said gripping elements and of said carrier means, and a medium in said chamber, capable of adapting itself to all shapes of said chamber, acting as a rigid abutment, and means for applying pressure to said medium in said chambers to cause relative movement of said elements.

7. A gripping device comprising jaws movable relative to a work piece to be gripped, each of said jaws comprising individually movable gripping elements, and a carrier means therefor fixed relative to a work piece in said device, a chamber formed by portions of said gripping elements and of said carrier means, and a medium in said chamber, capable of adapting itself to all shapes of said chamber, acting as a rigid abutment, and means for applying equalized pressure to said medium in said chambers to move said elements to grip said work piece with equal force.

8. In a gripping device for holding an irregular pre-located work piece, a plurality of jaws, carrier members fixed relative to a work piece in said device for said jaws, chambers formed by portions of said jaws and carrier members, a medium in said chambers, capable of adapting itself to all shapes of said chambers, acting as a rigid abutment, means for moving one or more of said carrier members relative to said work piece, inter-connecting means between said chambers, and means for applying pressure to said inter-connecting means so as to cause equalizing gripping action of said jaws upon said work piece whereby said work piece may be rigidly held in pre-located position.

9. In a gripping device for holding an irregular pre-located work piece without distortion, jaw-carrying members, some fixed and others movable relative to said pre-located work piece, means for fixing said movable jaw-carrying members relative to said work piece when gripping said work piece in said device, jaws in said members movable relative to said work piece, chambers formed by portions of said jaws and of said carrier members, a medium in said chambers, capable of adapting itself to all shapes of said chambers, acting as a rigid abutment, inter-connecting means between said chambers, and means for applying pressure to said inter-connecting means whereby said jaws grip and hold said work piece in pre-located position when said movable jaw-carrying members are fixed relative to said work piece.

10. In a chuck adapted to grip a pre-located work piece in a lathe, a rotatable chuck body, a series of compensating plungers, movable relative to said work piece, mounted in said chuck body, a clamp, movable relative to said work piece, mounted on said chuck body, a series of compensating plungers movable in said clamp relative to said work piece and said first mentioned series of plungers, means for fixing said clamp in a predetermined position relative to said work piece when gripping said work piece in said chuck, inter-connecting means between said plungers, and means for applying pressure to said inter-connecting means to cause equalizing gripping action of said plungers upon said work piece for rigidly holding and rotating said work piece in pre-located position.

11. In a chuck adapted to grip a pre-centered work piece in a lathe, a rotatable chuck body, a series of compensating plungers, movable relative to said work piece, mounted in said chuck body, a chamber formed by portions of said series of plungers and said chuck body, a clamp movable relative to said work piece mounted on said chuck body, a second series of compensating plungers movable relative to said work piece, said clamp, and said first mentioned series of plungers, a chamber formed by portions of said second series of plungers and said clamp, means for maintaining said clamp in a predetermined position relative to said work piece when gripping said work piece in said chuck, a medium in said chambers, capable of adapting itself to all shapes of said chambers, acting as a rigid abutment, inter-connecting means between said chambers, and means operating in conjunction with said inter-connecting means to cause relative movement of said plungers and said work piece.

12. In a center drive chuck, a ring gear having an axial bore, a series of compensating plungers mounted in said bore to one side of the axis of rotation of said chuck, a second series of compensating plungers arranged in a movable member at the opposite side of the axis of rotation of said chuck from said first mentioned series of plungers, means associated with said ring gear to prevent movement of said last mentioned member, chambers behind said plungers, a pressure receiving medium in said chambers, means engaging the medium in said chambers, and pressure means cooperating with said last mentioned means to urge said plungers toward said axis of rotation.

13. In a center drive chuck, a ring gear having an axial bore, a series of compensating plungers mounted in said bore to one side of the axis of rotation of said chuck, a second series of compensating plungers arranged at the opposite side of the axis of rotation of said chuck from said first mentioned series of plungers, chambers behind said plungers, a pressure receiving medium in said chambers, movable plungers adapted to engage the medium in said chambers, and wedge means for actuating said last mentioned plungers to cause said series of plungers to be moved relative to said axis of rotation of said chuck.

14. In a center drive chuck, a ring gear having an axial bore, a series of compensating plungers mounted in said bore to one side of the axis of rotation of said chuck, a second series of compensating plungers arranged at the opposite side of the axis of rotation of said chuck from said first mentioned series of plungers, chambers behind said plungers, a pressure receiving medium in said chambers, movable plungers adapted to engage the medium in said chambers, a rotatable shaft having an eccentric mounted on said ring gear, a wedge pivotally mounted on said eccentric and engaging said last mentioned plungers, and means for rotating said shaft whereby said series of plungers are moved relative to said axis of rotation of said chuck.

15. In a center drive chuck, adapted to grip a pre-located rough work piece, a ring gear having an axial bore, a plurality of series of compensating plungers mounted in said bore adapted to movement perpendicular to the axis of rotation of the chuck, and means for engaging all of said series of plungers with a rough irregular work piece so as to rigidly support and drive said work piece in accurate pre-centered position.

16. In a center drive chuck adapted to grip a pre-located rough work piece, a ring gear having an axial bore, a plurality of peripherally spaced individual compensating plungers in said bore adapted to move perpendicular to the axis of rotation of said chuck, and means for engaging all of said plungers with a rough irregular work piece so as to rigidly support and drive said work piece in accurate pre-centered position.

17. In a center drive chuck, a ring gear having an axial bore, a plurality of series of compensating plungers mounted in said bore to one side of the axis of rotation of said chuck for movement perpendicular to said axis, a second plurality of series of compensating plungers arranged at the opposite side of the axis of rotation of said chuck from said first mentioned plungers, chambers behind said plungers, a pressure receiving medium in said chambers, movable plungers adapted to engage the medium in said chambers, and wedge means for actuating said last mentioned plungers to cause said plungers to be moved relative to said axis of rotation of said chuck.

18. In a center drive chuck, a ring gear having an axial bore, a series of peripherally spaced compensating plungers mounted in said bore to one side of the axis of rotation of said chuck for movement perpendicular to said axis, a second series of peripherally spaced plungers arranged at the opposite side of the axis of rotation of said chuck from said first mentioned plungers, chambers behind said plungers, a pressure receiving medium in said chambers, movable plungers adapted to engage the medium in said chambers, and wedge means for actuating said last mentioned plungers to cause said plungers to be moved relative to said axis of rotation of said chuck.

19. In a center drive chuck, a ring gear having an axial bore, a plurality of series of compensating plungers mounted in said bore to one side of the axis of rotation of said chuck for movement perpendicular to said axis, a second plurality of series of compensating plungers arranged at the opposite side of the axis of rotation of said chuck from said first mentioned plungers, chambers behind said plungers, a pressure receiving medium in said chambers, movable plungers adapted to engage the medium in said chambers, a rotatable shaft having an eccentric mounted on said ring gear, a wedge pivotally mounted on said eccentric and engaging said last mentioned plungers, and means for rotating said shaft whereby said series of plungers are moved relative to said axis of rotation of said chuck.

20. In a center drive chuck, a ring gear having an axial bore, a series of peripherally spaced compensating plungers mounted in said bore to one side of the axis of rotation of said chuck for movement perpendicular to said axis, a second series of peripherally spaced plungers arranged at the opposite side of the axis of rotation of said chuck from said first mentioned plungers, chambers behind said plungers, a pressure receiving medium in said chambers, movable plungers adapted to engage the medium in said chambers, a rotatable shaft having an eccentric mounted on said ring gear, a wedge pivotally mounted on said eccentric and engaging said last mentioned plungers, and means for rotating said shaft whereby said series of plungers are moved relative to said axis of rotation of said chuck.

WILLIAM F. GROENE.